(12) United States Patent
Vogt et al.

(10) Patent No.: US 12,233,442 B2
(45) Date of Patent: Feb. 25, 2025

(54) SHEET STEEL HAVING A DETERMINISTIC SURFACE STRUCTURE

(71) Applicant: ThyssenKrupp Steel Europe AG, Duisburg (DE)

(72) Inventors: Oliver Vogt, Dortmund (DE); Fabian Junge, Düsseldorf (DE); Christine Bischoff, Drensteinfurt (DE); Burak William Cetinkaya, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 303 days.

(21) Appl. No.: 17/641,496

(22) PCT Filed: Sep. 8, 2020

(86) PCT No.: PCT/EP2020/075083
§ 371 (c)(1),
(2) Date: Mar. 9, 2022

(87) PCT Pub. No.: WO2021/052818
PCT Pub. Date: Mar. 25, 2021

(65) Prior Publication Data
US 2022/0305538 A1    Sep. 29, 2022

(30) Foreign Application Priority Data

Sep. 17, 2019 (DE) .................. 10 2019 214 135.8

(51) Int. Cl.
*B21B 1/22* (2006.01)
*C21D 8/04* (2006.01)
*C23C 2/06* (2006.01)
*C23C 2/26* (2006.01)

(52) U.S. Cl.
CPC ............ *B21B 1/227* (2013.01); *C21D 8/0442* (2013.01); *C23C 2/06* (2013.01); *C23C 2/26* (2013.01); *B21B 2001/228* (2013.01); *B21B 2261/14* (2013.01); *Y10T 428/12993* (2015.01)

(58) Field of Classification Search
None
See application file for complete search history.

(56) References Cited

U.S. PATENT DOCUMENTS

| 4,783,378 A | 11/1988 | Wakui et al. |
| 4,798,772 A | 1/1989 | Furukawa |
| 5,358,794 A | 10/1994 | Kawamoto et al. |

(Continued)

FOREIGN PATENT DOCUMENTS

| DE | 102007032874 A1 | 1/2009 |
| DE | 102010007840 A1 | 8/2011 |

(Continued)

OTHER PUBLICATIONS

International Search Report and Written Opinion for International Application No. PCT/EP2020/075083 mailed Dec. 15, 2020.

(Continued)

*Primary Examiner* — Seth Dumbris
(74) *Attorney, Agent, or Firm* — RMCK Law Group PLC

(57) ABSTRACT

The invention relates to sheet steel, more particularly a coated sheet steel, which is skin-pass rolled with a deterministic surface structure, and to a method for producing this steel.

9 Claims, 3 Drawing Sheets a)

b)

(56) References Cited

U.S. PATENT DOCUMENTS

Figure 1:
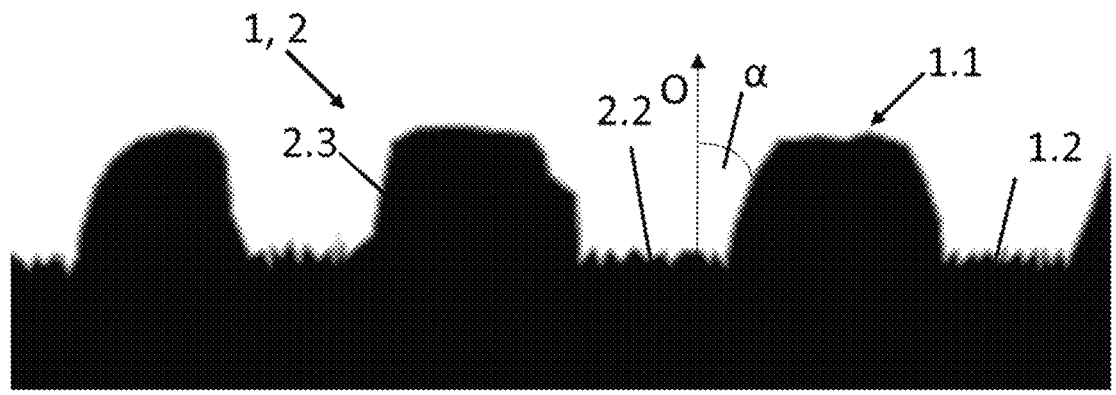
Figure 1:
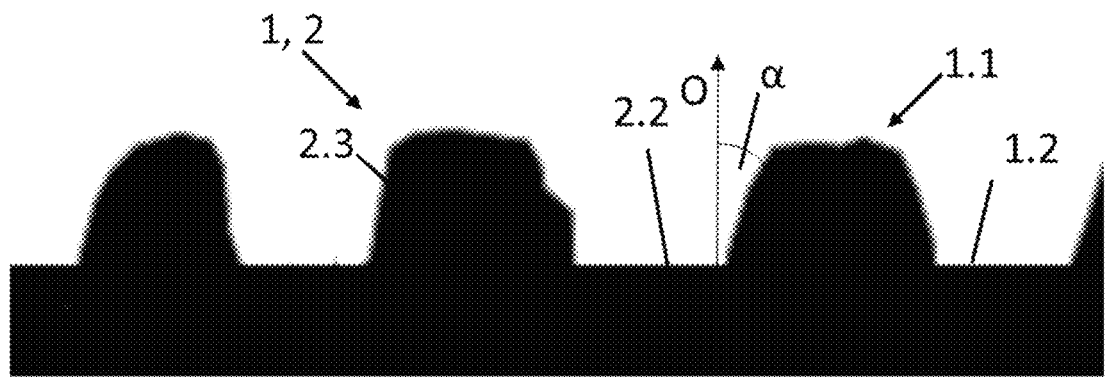

| | | | |
|---|---|---|---|
| 5,532,051 A | | 7/1996 | Nishiura et al. |
| 6,797,411 B2* | | 9/2004 | Sodani .................. C23C 2/26 427/349 |
| 9,623,457 B2 | | 4/2017 | Wu et al. |
| 2011/0111255 A1* | | 5/2011 | Diez .................. C23C 30/00 427/398.1 |
| 2012/0211123 A1* | | 8/2012 | Honda .................. C23C 2/28 148/400 |
| 2012/0301740 A1 | | 11/2012 | Buresch et al. |
| 2015/0209848 A1* | | 7/2015 | Kopplin ............. B23K 26/0823 428/659 |
| 2018/0345339 A1 | | 12/2018 | Jeon et al. |

FOREIGN PATENT DOCUMENTS

| | | | |
|---|---|---|---|
| DE | 102012017703 A1 | 3/2014 | |
| DE | 112013000848 T5 | 11/2014 | |
| DE | 102016102723 | 6/2017 | |
| EP | 1584396 A2 | 10/2005 | |
| EP | 2892663 B1 | 11/2016 | |
| EP | 3354360 A1 | 8/2018 | |
| JP | S6311689 A | 1/1988 | |
| JP | S63132701 A | 6/1988 | |
| JP | H05237505 A | 9/1993 | |
| JP | H079015 A | 1/1995 | |
| JP | H079016 A | 1/1995 | |
| JP | H0929304 A | 2/1997 | |
| JP | 2006167783 A | 6/2006 | |
| JP | 2011521103 A | 7/2011 | |
| WO | 2009000771 A1 | 12/2008 | |
| WO | WO-2011052269 A1 * | 5/2011 | ........... B32B 15/013 |

OTHER PUBLICATIONS

DIN EN 1669—Aluminum and aluminum alloys—Test methods—Earing test for sheet and strip; 1996.

DIN EN ISO 4287—Geometrical Product Specifications (GPS)—Surface texture: Profile method—Terms, definitions and surface texture parameters.

Sep. 1941—Measurement of the waviness characteristic value Wsa (1-5) on cold rolled metallic flat products, May 2012.

German Office Action for Application No. DE10 2019 214 135.8 mailed Jul. 24, 2024.

German Office Action for DE Application No. 10 2019 214 133.1 mailed Jul. 29, 2024.

Chinese Office Action for CN Application No. 202080065232.9 mailed Nov. 1, 2024.

Japanese Office Action for JP Application No. 2022-516654 mailed Sep. 12, 2024.

* cited by examiner

SHEET STEEL HAVING A DETERMINISTIC SURFACE STRUCTURE

CROSS-REFERENCE TO RELATED APPLICATIONS

This application is a 371 U.S. National Stage of International Application No. PCT/EP2020/075083, filed Sep. 8, 2020, which claims the benefit of German Patent Application No. 10 2019 214 135.8 filed Sep. 17, 2019. The disclosures of each of the above applications are incorporated herein by reference in their entirety.

The invention relates to a sheet steel, more particularly a coated sheet steel, which is skin-pass rolled with a deterministic surface structure. The invention further relates to a method for producing a sheet steel, more particularly a coated sheet steel, which is skin-pass rolled with a deterministic surface structure.

The prior art generically discloses sheet steels, more particularly coated sheet steels, which have been skin-pass rolled with a deterministic surface structure: see, for example, patent specification EP 2 892 663 B1.

There is a need to optimize the known prior art, particularly in terms of reducing the surface weight of oil.

The object is therefore to provide a sheet steel, more particularly a coated sheet steel, which is skin-pass rolled with a deterministic surface structure and which by comparison with the prior art provides equivalent or better properties with at the same time reduced oil usage.

The object is achieved with the features of claim 1.

The inventors have found that in the case of a sheet steel, more particularly a coated sheet steel, which has been skin-pass rolled with a deterministic surface structure, equivalent or better properties by comparison with the prior art, in particular with reduced oil usage at the same time, can be provided if the surface structure is impressed into the sheet steel, particularly coated sheet steel, starting from a surface of the sheet steel, particularly coated sheet steel, where the surface structure has a flank region which runs, starting from the surface, down to a valley region, where in accordance with the invention at least the valley region has a roughness Ra of less than 300 nm, preferably in order to minimize the oil requirement. By restricting the roughness Ra—the measurement method for determining the value of Ra is specified in DIN ISO EN 4287—at least in the valley region of the surface structure with a roughness Ra of less than 300 nm, more particularly less than 250 nm, preferably less than 200 nm, more preferably less than 150 nm, very preferably less than 100 nm, it is possible in particular to influence the local oil distribution, and so within the structure, in the context of capillary forces acting in the direction of the flank region, the oil wets the valley region only in small parts or not at all, and accumulates along the flank region. The lower the roughness Ra established in the valley region, the greater the possible influence of the capillary force in the direction of the flank region, and so the characteristics according to the invention of the deterministic surface structure actually make it possible to provide a sheet steel, more particularly a coated sheet steel, featuring reduced oil requirement.

The term "deterministic surface structure" refers to repeating surface structures which exhibit a defined shape and/or design; cf. EP 2 892 663 B1. In particular this also includes surfaces having a (quasi-)stochastic aspect but which are nevertheless applied by means of a deterministic texturing process and which therefore are composed of deterministic shape elements.

The term "sheet steel" refers generally to a flat steel product which may be provided in sheet form or else in plate form or in strip form.

The sheet steel configured in accordance with the invention may be uncoated or, preferably, coated. If the sheet steel is coated, the coating of the coated sheet steel comprises a metallic coating.

Further advantageous refinements and developments are apparent from the description below. One or more features from the claims, the description or the drawing may be linked with one or more other features therefrom to give further refinements of the invention. It is also possible for one or more features from the independent claims to be linked by one or more other features.

According to one embodiment of the sheet steel of the invention, the surface structure has a flank region which runs, starting from the surface, down to a valley region and is configured with an angle of between 1° and 89° to the perpendicular of the sheet steel, more particularly coated sheet steel. The angle configured may be more particularly between 50° and 87°, preferably between 60° and 85°, very preferably between 65° and 82°. The valley and flank region (negative form) of the surface structure corresponds essentially to the surface (positive form) on a skin-pass roll which configures or impresses the surface structure by corresponding action on the sheet steel, more particularly coated sheet steel. The flank region bordering and configuring the surface structure, together with the valley region connected in one piece to the flank region, defines a closed volume of the surface structure impressed by skin-pass rolling into the sheet steel, more particularly coated sheet steel. For subsequent processing by means of forming methods, the closed volume, referred to as the empty volume, may be adapted to the forming fluid, more particularly oil, that is to be applied.

According to one embodiment of the sheet steel of the invention, the sheet steel is coated with a zinc-based coating which is applied by hot-dip coating, where in the coating, as well as zinc and unavoidable impurities, there may be additional elements such as aluminum with a content of up to 5 wt % and/or magnesium with a content of up to 5 wt % in the coating. Sheet steels with a zinc-based coating feature very good cathodic corrosion protection, which has been used for years in automaking. Where improved corrosion protection is provided, the coating additionally comprises magnesium with a content of at least 0.3 wt %, more particularly of at least 0.6 wt %, preferably of at least 0.9 wt %. Aluminum may be present alternatively or additionally to magnesium, with a content of at least 0.3 wt %, in order in particular to improve the attachment of the coating to the sheet steel and in particular to prevent, substantially, diffusion of iron from the sheet steel on heat treatment of the coated sheet steel, so making it possible to ensure high bonding suitability, for example. The coating in this case may have a thickness of between 1 and 15 μm, more particularly between 2 and 12 μm, preferably between 3 and 10 μm. Below the minimum limit, sufficient cathodic corrosion protection may not be ensured, and above the maximum limit there may be joining problems when the sheet steel of the invention or a component fabricated from it is joined to another component; in particular, no assurance can be given of a stable operation of thermal joining or welding if the coating thickness exceeds the maximum specified limit.

According to one embodiment of the sheet steel of the invention, the sheet steel, more particularly coated sheet steel, is additionally oiled with an oil, where in particular the oil is taken up with a surface weight of up to 2 g/m$^2$ in the surface structure. Because of the dimensioning of the surface structure there is only a small oil requirement, and so the surface weight is limited to up to 2 g/m², more particular up to 1.5 g/m², preferably up to 1.2 g/m², more preferably up to 1 g/m². As a result in particular of the strong capillary force in the direction of the flank region and of the minimal roughness in the valley region, the oil after oiling is deposited substantially along the flank region and/or at the transition between flank region and valley region of the surface structure, and is available for further operations, shaping operations for example, preferably for deep-drawing operations, in order to improve lubrication and to reduce friction and hence the wear of the shaping means, shaping apparatuses for example, preferably (deep-drawing) presses. It is possible in particular to achieve effective suppression of the accumulation of the oil at tribologically unfavorable regions which make no contribution to the supply of oil to the actual zone of contact or friction. The sheet steel of the invention with reduced surface weight of oil, accordingly, has very good tribological properties and is more eco-friendly, owing in particular to reduced usage of resources, by comparison with the oiled sheet steels known from the prior art.

In a second aspect the invention relates to a method for producing a sheet steel, more particularly coated sheet steel, skin-pass rolled with a deterministic surface structure, comprising the following steps:

providing a sheet steel, more particularly a coated sheet steel, skin-pass rolling the sheet steel, more particularly coated sheet steel, with a skin-pass roll, where the surface of the skin-pass roll which acts on the surface of the sheet steel, more particularly coated sheet steel, is furnished with a deterministic surface structure such that after the skin-pass rolling, the surface structure is impressed into the sheet steel, more particularly coated sheet steel, starting from a surface of the sheet steel, more particularly coated sheet steel, where the surface structure has a flank region which runs, starting from the surface, down to a valley region, and where at least the valley region has a roughness Ra of less than 300 nm.

By action of force on the surface of the sheet steel, more particularly coated sheet steel, the surface (positive form) of the skin-pass roll configures a surface structure which defines a valley and flank region (negative form) and corresponds substantially to the surface (positive form) of the skin-pass roll. For purpose of configuring a deterministic surface structure, the skin-pass roll may be worked using suitable means, lasers for example -cf. EP 2 892 663 B1. Furthermore, other methods of removal of material may be used in order to establish a surface on a skin-pass roll, examples being machining processes with geometrically defined or undefined cutting, chemical or electrochemical, optical or plasma-induced processes, which are suitable for implementing a roughness Ra of less than 300 nm at least in the valley region of a surface structure of a coated sheet steel for skin-pass rolling. Alternatively or additionally, the skin-pass roll may also be subjected to an afterworking operation, preferably a grinding operation, which smooths in particular that part of the skin-pass roll which forms the valley region in a sheet steel, more particularly a coated sheet steel, said part in this case being a corresponding peak region or plateau on the surface of the skin-pass roll, and this makes it possible, optionally, to reduce the roughness further.

In order to avoid repetition, reference is made respectively to the statements about the steel sheet of the invention, more particularly coated steel sheet of the invention, skin-pass rolled with a deterministic surface structure.

According to one embodiment of the method of the invention, prior to the providing of the sheet steel, the sheet steel is coated by hot-dip coating. The melt for the hot-dip coating may preferably comprise, as well as zinc and unavoidable impurities, additional elements such as aluminum with a content of up to 5 wt % and/or magnesium with a content of up to 5 wt %.

According to one embodiment of the method of the invention, the sheet steel after skin-pass rolling is additionally oiled with oil, the oil being applied with a surface weight of up to 2 g/m², preferably with a surface weight of up to 1 g/m².

Specific embodiments of the invention are more fully explained in detail below with reference to the drawing. The drawing and accompanying description of the resulting features are not to be read as restrictive on the respective embodiments, but serve to illustrate exemplary embodiments. Furthermore, the respective features may be utilized with one another and also with features of the above description for possible further developments and improvements of the invention, especially in the context of additional embodiments which are not shown. Identical parts are always given the same reference symbols.

IN THE DRAWING

Figure 2:
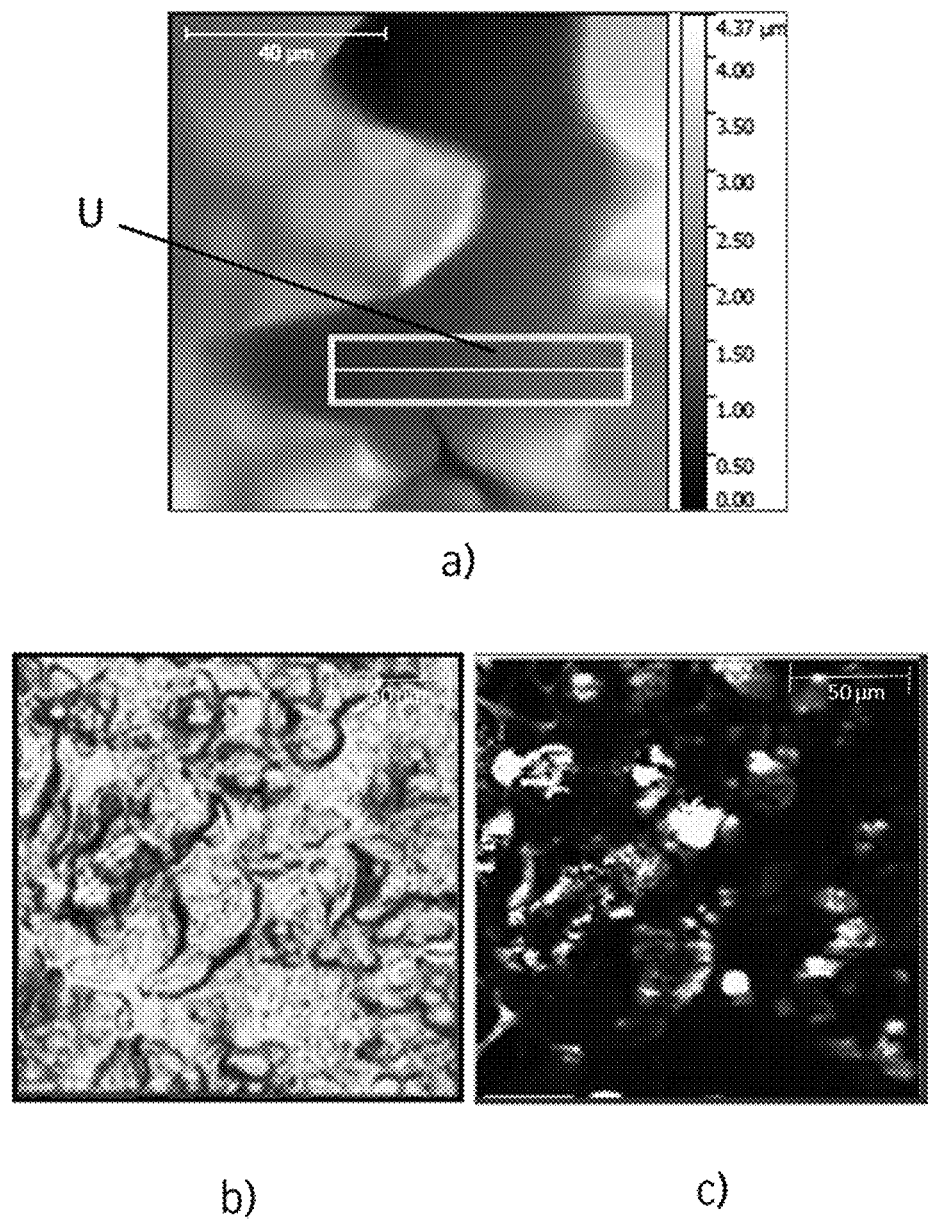
Figure 3:
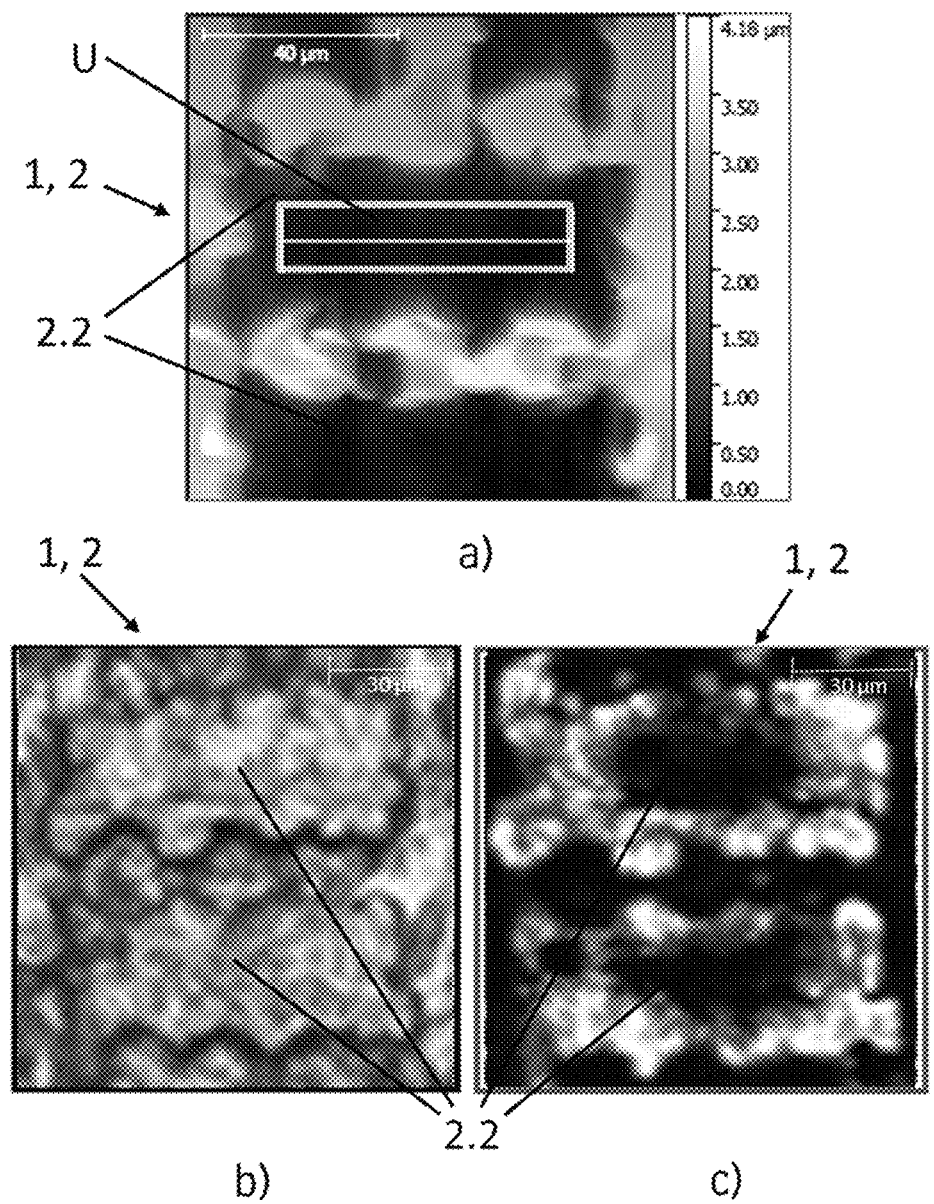

FIGS. 1a) and 1b) each show a schematic view in partial section of first and second exemplary embodiments of the invention of a coated sheet steel skin-pass rolled with a deterministic surface structure, FIGS. 2a), 2b) and 2c) show partial representations of a sheet steel coated in accordance with the prior art and skin-pass rolled with a stochastic surface structure, and FIGS. 3a), 3b) and 3c) show partial representations of a coated sheet steel of a third exemplary embodiment of the invention, skin-pass rolled with a deterministic surface structure.

FIGS. 1a) and 1b) each represent a schematic view in partial section of first and second exemplary embodiments according to the invention of a coated sheet steel (1) skin-pass rolled with a deterministic surface structure (2). The surface structure (2) is impressed, starting from a surface (1.1) of the sheet steel (1), into the coated sheet steel (1), with the surface structure (2) having a flank region (2.3) which runs, starting from the surface (1.1), down to a valley region (2.2). At least the valley region (2.2) has a roughness Ra of less than 300 nm. Depending on the method of material removal used to work the corresponding skin-pass roll (not shown) for rolling the coated sheet steel (1), the valley region (2.2) may be established by means of the corresponding region on the skin-pass roll not shown (peak region/plateau). The skin-pass roll may additionally be afterworked by means of a grinding operation, where the peak region/plateau is smoothed accordingly, allowing a further reduction in the roughness Ra to be implemented in the valley region (2.2). It is readily apparent in FIGS. 1a) and 1b), furthermore, that the surface structure (2) has a flank region (2.3) which runs, starting from the surface (1.1), down to a valley region (2.2) and is configured with an angle (α) of between 1° and 89° to the perpendicular (O) of the coated sheet steel (1). Together with the valley region (2.2) attached or connected in one piece to the flank region (2.3), the flank region (2.3) which borders and configures the surface structure (2) defines a closed volume of the surface structure (2) impressed into the coating sheet steel (1) by skin-pass rolling. FIG. 1b) shows a smoother and consequently low roughness Ra in the valley region (2.2) by comparison with FIG. 1a), which has been worked by means of a ground skin-pass roll which is not shown, and so a deterministic surface structure (2) can be produced on a coated sheet steel (1), it being possible for this structure to be established at least in the valley region (2.2) of the surface structure (2) with a roughness Ra more particularly of less than 250 nm, preferably less than 200 nm, more preferably less than 150 nm, very preferably less than 100 nm. The embodiment of the surface structure in accordance with the invention may also be implemented on an uncoated sheet steel.

FIGS. 2a), 2b) and 2c) show partial representations of a sheet steel coated in accordance with the prior art and skin-pass rolled with a stochastic surface structure. The surface structure was imparted using an EDT-textured and subsequently ground skin-pass roll (not depicted). Depicted in FIG. 2a) is a detail of a sheet topography provided with a zinc coating, measured by atomic force microscopy (AFM). The roughness Ra based on an area (U) of 60×12.5 µm² was determined in the valley region, the value found for Ra being 323 nm. Shown illustratively is a distribution of oil on a sheet topography rolled using an EDT-textured and subsequently ground skin-pass roll (not depicted) and provided with a zinc coating, with FIG. 2b) depicting a detail by means of optical microscopy and FIG. 2c) depicting the same detail but by Raman spectroscopy, with the surface oil showing as light. The valley region of the surface structure was in part filled entirely with oil, with the surface weight of oil being more than 2 g/m².

A different outcome is apparent when looking at the partial representations of a coated sheet steel (1), skin-pass rolled with a deterministic surface structure, in a third exemplary embodiment of the invention, FIGS. 3a), 3b) and 3c). The surface structure was imparted using a laser-structured and subsequently ground skin-pass roll (not shown). The deterministic surface structure (2) was started using the example of a constantly repeating I-shaped impression. Other forms of implementation are likewise conceivable and employable, and are not confined to an I-shaped impression. FIGS. 3a), 3b) and 3c) show two I-shaped impressions disposed next to one another. FIG. 3a) shows a detail of a sheet topography (1, 2) provided with a zinc coating (1.2) and measured by atomic force microscopy (AFM). The roughness Ra based on an area (U) of 60×12.5 µm² was determined in the valley region (2.2), the value found for Ra being 77 nm. Shown illustratively is a distribution of oil on a sheet topography rolled using an EDT-textured and subsequently ground skin-pass roll (not depicted) and provided with a zinc coating, with FIG. 2b) depicting a detail by means of optical microscopy and FIG. 2c) depicting the same detail but by Raman spectroscopy, with the surface oil showing as light. The valley region (2.2) of the surface structure (2) was substantially not wetted with oil, with the oil having accumulated along the flank region (2.3) and/or at the transition between flank region (2.3) and valley region (2.2), owing to the capillary effect and to the reduced roughness Ra of less than 300 nm in the valley region (2.2). The surface weight of oil was reduced to up to 1.5 g/m², more particularly to up to 1 g/m².

For further studies, four coated and skin-pass-rolled steel sheets (V1 to V4) were produced. The same type of coating was selected for all of the steel sheets: a zinc-based coating (zinc and unavoidable impurities) which was applied in a hot-dip coating operation and had a thickness of around 7 µm. V1 and V2 correspond to steel sheets (1) of the invention, and V3 and V4 form reference sheets, differing from V1 and V2 in that the skin-pass roll had a stochastic surface structure, the surface of the skin-pass roll having been textured by means of EDT, for example, meaning that a stochastic surface structure was also impressed into the reference sheets. Table 1 contrasts the steel sheets (1) according to the invention with the reference sheets.

TABLE 1

| Steel sheets | Ra [µm] | Rz [µm] | Wsa [µm] | RPc [1/mm] | Ra [nm], valley region | Oil [g/m²] | Cup-drawing test |
|---|---|---|---|---|---|---|---|
| V1 | 0.771 | 3.62 | 0.0783 | 11.9 | 121 | 1 | ++ |
| V2 | 1.43 | 5.92 | 0.113 | 13.9 | 189 | 1.3 | + |
| V3 | 1.08 | 7.53 | 0.198 | 10.2 | 367 | 2 | 0 |
| V4 | 1.08 | 6.81 | 0.198 | 10.1 | 420 | 1.8 | − |

The determination of the surface parameters Ra (arithmetic mean roughness), Rz (mean roughness depth) and RPc (peak count determined along a defined length, in the above case per mm) may be derived from DIN EN ISO 4287, and the characteristic value for the long-wave waviness Wsa (arithmetic mean waviness) in accordance with SEP1941. The data in table 1 in relation to a strip drawing test, a cup-drawing test according to DIN EN 1669, which was carried out under the same conditions for all four steel sheets V1 to V4, show surprisingly, however, that better results were achievable in comparison between V1/V2 and V3/V4. Evaluation was made according to the following criteria:
++ means that not only the friction coefficient determined in the strip drawing test but also the thinning in the outgoing portion of the punch edge on the formed steel sheet are lower (low level of thinning, less than 5% of the original steel sheet thickness),
+ means that the minimal thinning on the reshaped steel sheet is more than 5% but less than 10% of the original steel sheet thickness,
0 indicates a markedly recognizable thinning without ruptures, which is no longer in the tolerable range (15% to 25% of the original steel sheet thickness), and
− means that ruptures occur.

At the same time, moreover, it was possible to reduce the surface weight of oil on the steel sheet V1 and V2, coated in accordance with the invention and skin-pass rolled with a deterministic surface structure, to below 1.5 g/m², the quantity being sufficient to achieve an appropriately good outcome.

The invention claimed is:

1. A sheet steel skin-pass rolled with a deterministic surface structure, where the surface structure, is impressed into the sheet steel starting from a surface of the sheet steel, the surface structure having a flank region which runs, starting from the surface, down to a valley region, wherein the valley region has a roughness Ra of less than 300 nm, the sheet steel having a zinc-based coating, and the coated sheet steel is oiled such that capillary forces acting in a direction of the flank region influences local oil distribution wherein the oil wets the valley region only in small parts or not at all and accumulates in the flank region due to the roughness Ra, wherein the valley region has a roughness Ra of less than 250 nm.

2. The sheet steel as claimed in claim 1, where the flank region is configured with an angle (α) of between 1° and 89° to the perpendicular (O) of the sheet steel.

3. The sheet steel as claimed in claim 2, wherein the zinc-based coating is applied by hot-dip coating, where in the coating, as well as zinc and unavoidable impurities, there includes additional elements including at least one of aluminum with a content of up to 5 wt % and magnesium with a content of up to 5 wt % in the coating.

4. The sheet steel as claimed in claim 1, wherein the oil has a surface weight of up to 2 g/m² in the surface structure.

5. The sheet steel as claimed in claim 1, wherein the oil has a surface weight of up to 1.5 g/m² in the surface structure.

6. The sheet steel as claimed in claim 1, wherein the oil has a surface weight of up to 1 g/m² in the surface structure.

7. The sheet steel as claimed in claim 1, wherein the valley region has a roughness Ra of less than 200 nm.

8. The sheet steel as claimed in claim 1, wherein the valley region has a roughness Ra of less than 150 nm.

9. The sheet steel as claimed in claim 1, wherein the valley region has a roughness Ra of less than 100 nm.

* * * * *